United States Patent [19]
Ishibashi et al.

[11] Patent Number: 5,621,774
[45] Date of Patent: Apr. 15, 1997

[54] METHOD AND APPARATUS FOR SYNCHRONIZING PARALLEL DATA TRANSFER

[75] Inventors: Kenichi Ishibashi, Kokubunji; Akira Tanaka, Koganei; Akira Yamagiwa, Hadano; Takehisa Hayashi, Sagamihara, all of Japan

[73] Assignee: Hitachi, Ltd., Tokyo, Japan

[21] Appl. No.: 348,242

[22] Filed: Nov. 28, 1994

[30] Foreign Application Priority Data

Nov. 30, 1993 [JP] Japan .................................. 5-299381

[51] Int. Cl.$^6$ ...................................................... H04L 7/00
[52] U.S. Cl. ............................. 375/371; 371/1; 327/152; 327/153
[58] Field of Search ........................... 375/354, 371; 371/1; 395/200.19; 327/152, 153, 161

[56] References Cited

U.S. PATENT DOCUMENTS

| | | | |
|---|---|---|---|
| 3,830,962 | 8/1974 | Mailloux | 358/406 |
| 4,348,762 | 9/1982 | Shiun et al. | 375/371 |
| 4,360,843 | 11/1982 | Menezes et al. | 360/72.2 |
| 4,672,639 | 6/1987 | Tanabe et al. | 375/371 |
| 4,805,195 | 2/1989 | Keegan | 375/371 |
| 4,965,884 | 10/1990 | Okura et al. | 375/354 |
| 4,999,526 | 3/1991 | Dudley | 327/152 |
| 5,034,967 | 7/1991 | Cox et al. | 375/371 |
| 5,272,729 | 12/1993 | Bechade et al. | 371/1 |
| 5,309,561 | 5/1994 | Overhouse et al. | 395/200.19 |
| 5,327,434 | 7/1994 | Kubo | 375/354 |
| 5,455,830 | 10/1995 | Gregg et al. | 371/1 |

FOREIGN PATENT DOCUMENTS

5-110550  4/1993  Japan ..................................... 371/1

*Primary Examiner*—Stephen Chin
*Assistant Examiner*—Jeffrey W. Gluck
*Attorney, Agent, or Firm*—Antonelli, Terry, Stout & Kraus, LLP

[57] ABSTRACT

A data transfer apparatus includes a transmitting apparatus having a pulse generation circuit for generating a plurality of data and a clock having a predetermined timing relation to the plurality of data, a receiving apparatus having latch circuits supplied with the clock and data for latching the plurality of data at a timing of the clock, respectively, transmission lines for connecting the transmitting apparatus and the receiving apparatus, a variable delay circuit for delaying the clock or data to be supplied to the latch circuits, and a variable delay control circuit for controlling an amount of delay of the variable delay circuit by means of output signals of the latch circuits to thereby minimize the cycle time of the data and clock in the data transfer between apparatuses.

5 Claims, 12 Drawing Sheets

FIG.1A
RECEIVING CIRCUIT

FIG.1B
TRANSMITTING CIRCUIT

METHOD AND APPARATUS FOR SYNCHRONIZING PARALLEL DATA TRANSFER

BACKGROUND OF THE INVENTION

The present invention relates to a data transfer apparatus and particularly to a technique for transferring data between apparatuses such as work stations and computers. More particularly, the present invention relates to a data transfer technique for latching a plurality of data input externally in synchronism with a clock input externally.

When data is transferred from one apparatus to another, there is considered a method in which data and clock are transmitted from a transmitting apparatus to a receiving apparatus and the data is latched in the receiving apparatus at the timing of the clock.

Figure 10:
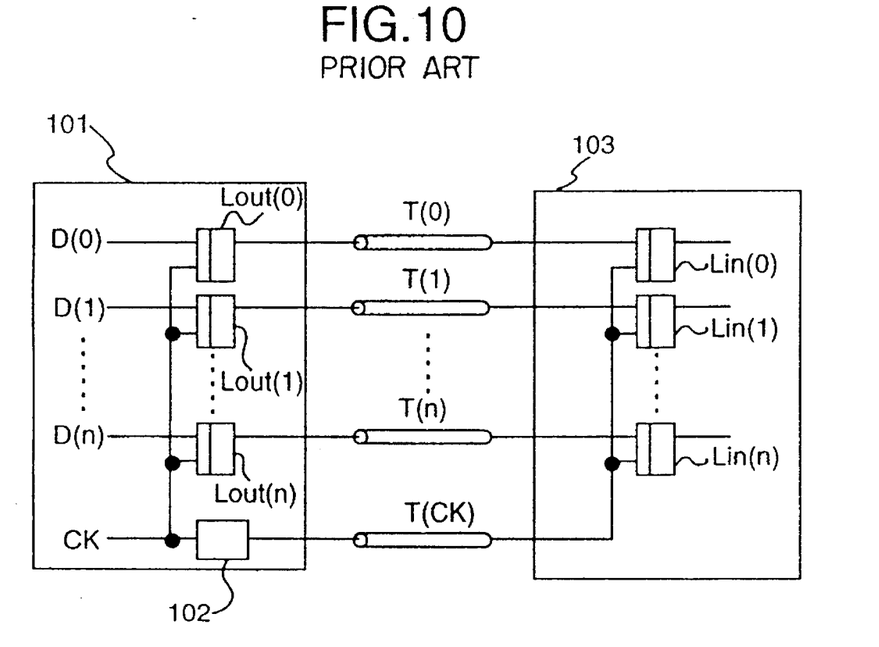
FIG. 10 is a schematic diagram illustrating a prior art apparatus.

FIG. 10 schematically illustrates an apparatus for achieving the above method, and numeral 101 represents a transmitting apparatus, D(0) to D(n) represent data to be transferred, CK represents a clock to be transferred, $L_{out}(0)$ to $L_{out}(n)$ represent latch circuits for synchronizing the data to be transmitted with the clock, 102 represents a delay circuit for delaying the clock, T(0) to T(n) and T(CK) represent transmission lines such as wirings on a printed wiring board and cables for connecting apparatuses, 103 represents a receiving apparatus and $L_{in}(0)$ to $L_{in}(n)$ latch circuits for latching received data and which are of edge-triggered type.

Figure 11:
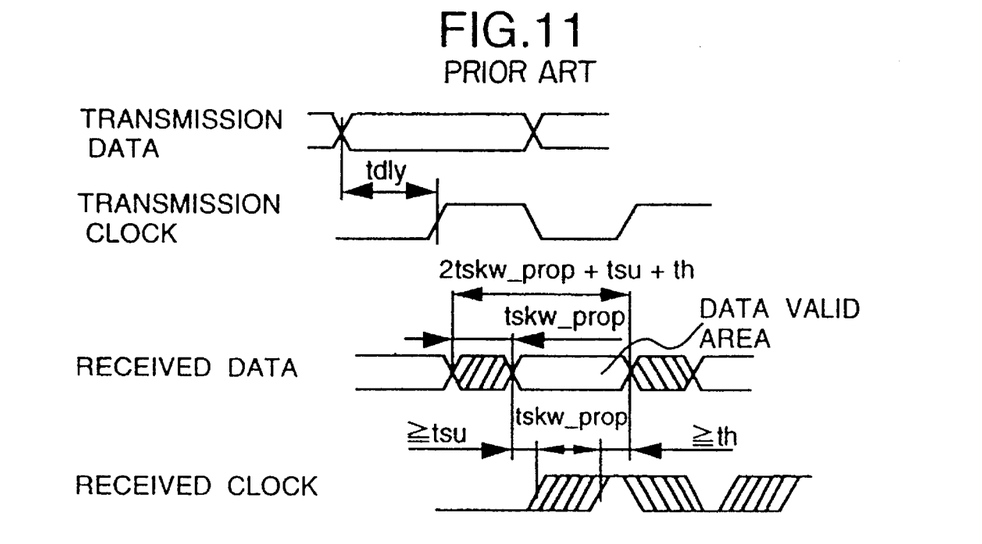
FIG. 11 shows the cycle time of data and clock in the prior art.

FIG. 11 is a timing chart for illustrating operation of the apparatus of FIG. 10. Since there are differences in the propagation time of the data and clock in the circuits and the transmission lines in the transmitting and receiving apparatuses when the data and clock are transferred, the arrival timings of the data and clock to the receiving apparatus 103 are scattered between the period of time designated by (tskw_prop). In order to latch the data in the receiving apparatus, it is necessary to design the timing in consideration of the scattering. More particularly, the clock is delayed by a time designated by tdly with respect to the data by the delay circuit 102 of the transmitting apparatus to be transmitted so that the rising edge of the received clock satisfies a set-up time (the data is required to be settled before a predetermined time of the clock and the predetermined time is called the set-up time tsu) and a hold time (the data is required to be held until after a predetermined time of the clock and the predetermined time is called the hold time th) of the latch within the valid area of the received data. Even if the design can be made to neglect the scattered delay time due to the delay circuit 102, the minimum repetition interval or cycle time of the data and clock at this time is a time designated by (2tskw_prop+tsu+th). The general cycle time in the data transfer is of the order of about several nanoseconds to several tens of nanoseconds.

A well known example pertinent to the above prior art is described in "Latest SCSI Manual", pp. 160, issued by CQ on Feb. 1, 1989. For example, in order to compensate for differences in the propagation time between signals due to cables when data is transferred in the synchronous mode, it is necessary to satisfy the prescribed time for the data and clock (REQ or ACK) in the transmitting apparatus. The above example prescribes the minimum compensation time 55 ns from switching of the data to rising of the clock, the minimum compensation time 100 ns from rising of the clock to switching of the next data and the minimum cycle time 180 ns of the clock.

Further, JP-A-5-75594 discloses automatic adjustment of a phase between the data and the clock and a phase between parallel bits in the parallel data transfer.

A semiconductor device which does not concern the transfer of parallel data but controls a delay amount of a variable delay circuit by an external control signal to set a delay time for data and clock in order to take in the data externally in synchronism with an external clock is disclosed in JP-A-2-226316.

In the apparatus of FIG. 10, the minimum cycle time of the received data and clock is the time (2tskw_prop+tsu+th) and the scattered propagation time of the signals from the transmitting apparatus to the receiving apparatus impedes the high-speed operation of data transfer.

Further, JP-A-5-75594 describes a bit phase synchronizing circuit on the side of the receiving apparatus in which the phase relation of the clock on the side of the receiving apparatus and the data for every parallel bit can be adjusted to latch the data without error, while the publication does not refer to any actual realization measures.

The semiconductor device disclosed in JP-A-2-226316 is a device for taking in one bit data, and requires new control measures in order to take in data composed of a plurality of bits.

SUMMARY OF THE INVENTION

It is an object of the present invention to reduce the minimum cycle time of data and clock signals to transfer data composed of a plurality of bits at a high speed.

According to an aspect of the data transfer apparatus of the present invention, a transmitting apparatus comprises means for generating pulse signals as a plurality of transmission data and transmission clock signals and a receiving apparatus comprises a variable delay circuit for delaying the received clock signals, latch circuits for latching received data at the timing of the clock signals delayed by the variable delay circuit, and a variable delay control circuit for controlling an amount of delay of the variable delay circuit by means of output signals of the latch circuits.

Figure 12:
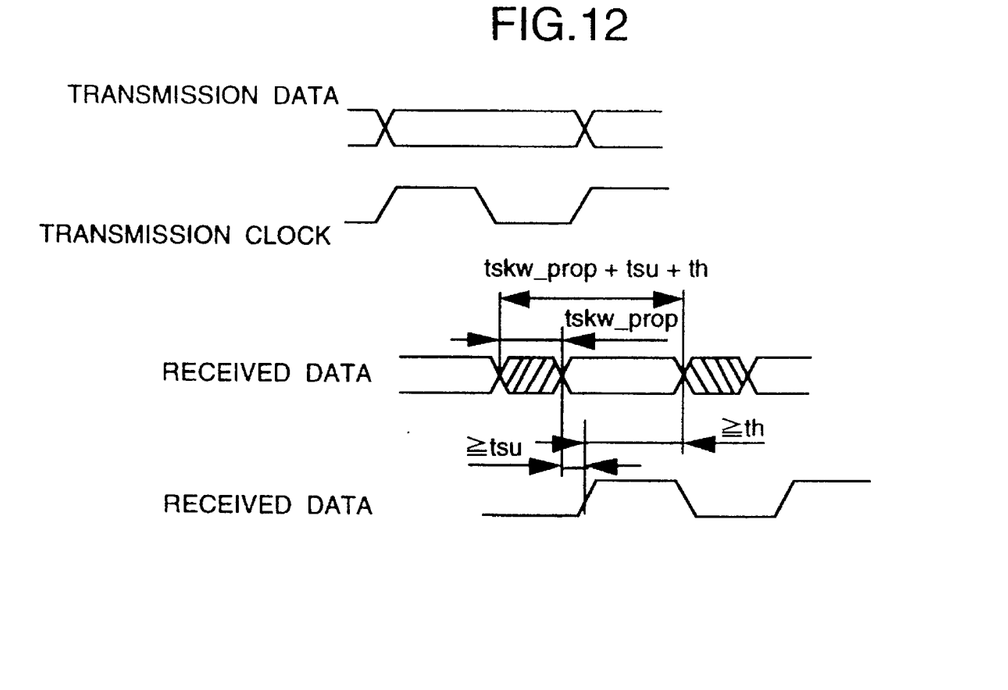
FIG. 12 shows the cycle time of data and clock in the first embodiment of the present invention.

The variable delay control circuit increases a delay time of the variable delay circuit gradually and completes its control when all of the plurality of received data can be latched by the latch circuits. The timing chart at this time is as shown in FIG. 12. It is not necessary to consider scattered propagation times of the received clock signals as compared with FIG. 11 and the minimum cycle time of the data and clock signals is (tskw_prop+tsu+th).

According to another aspect of the data transfer apparatus of the present invention, a transmitting apparatus comprises means for generating pulse signals as n transmission data and transmission clock signals and a receiving apparatus comprises n/m (1≦m≦n) variable delay circuits for delaying the received clock signals, latch circuits for latching the received data at the timing of the clock signals delayed by the variable delay circuit, and a variable delay control circuit for controlling an amount of delay of the variable delay circuit by means of output signals of the latch circuits.

Figure 13:
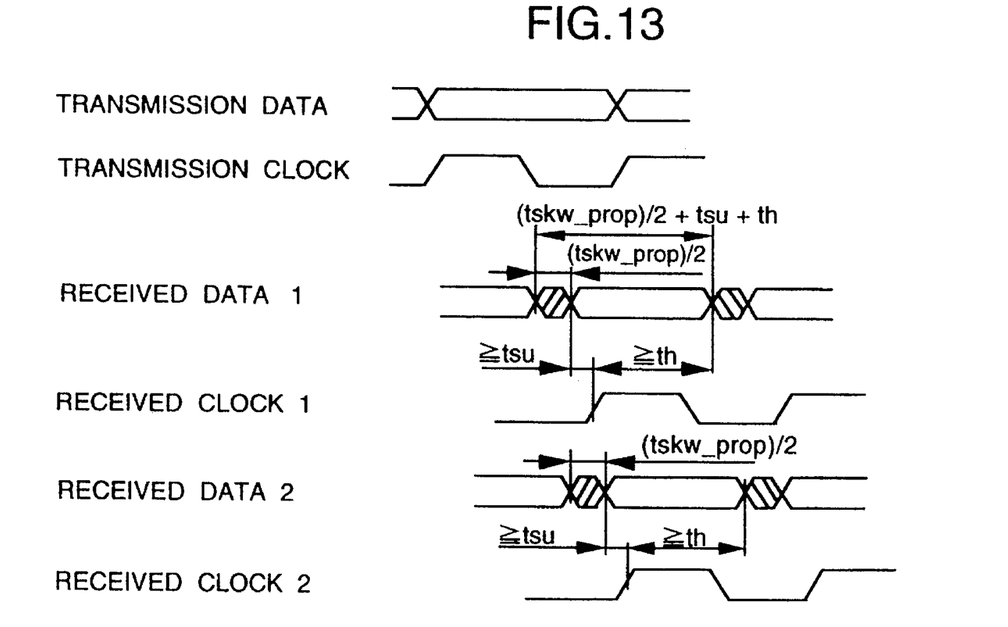
FIG. 13 shows the cycle time of data and clock in the second embodiment of the present invention.

The variable delay control circuit divides the data into n/m by means of the arrival time of data to the receiving apparatus and controls the delay times of the variable delay circuits so that m data can be latched by the latch circuits. The timing chart in the case of m=n/2 is as shown in FIG. 13. The n/2 received data 1 arriving early at the receiving apparatus is latched by the received clock 1 and the remaining n/2 received data 2 is latched by the received clock 2. It is not necessary to consider scattered propagation times of the received clock signals in the same manner as in FIG. 12. Further, when the scattered propagation times of data are close to the normal distribution, scattering of a half of the time (tskw_prop) may be considered and accordingly the minimum cycle time of the data and clock is {(tskw_prop)/2+tsu+th}.

Further, according to another aspect of the data transfer apparatus of the present invention, a transmitting apparatus comprises means for generating pulse signals as transmission data and transmission clock signals and a receiving apparatus comprises variable delay circuits for delaying the received data, latch circuits for latching the data delayed by the variable delay circuits at the timing of the received clock signals, and a variable delay control circuit for controlling the delay amount of the variable delay circuits by means of output signals of the latch circuits.

Figure 14:
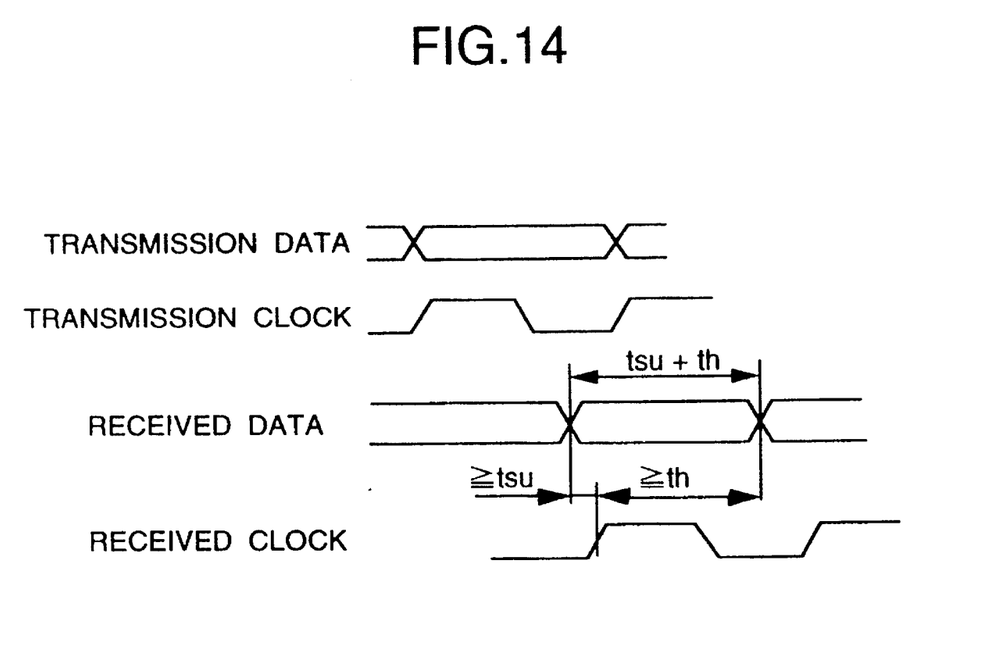
FIG. 14 shows the cycle time of data and clock in the third embodiment of the present invention.

The variable delay control circuit gradually reduces the delay time of the variable delay circuits for respective data and completes control of the variable delay circuits when the latch circuits can be latched. The timing chart at this time is as shown in FIG. 14. It is not necessary to consider scattered propagation times of the received data and the received clock as compared with FIG. 11 and the minimum cycle time of the data and clock is (tsu+th).

According to the present invention, the minimum cycle time of the data and clock can be made small and the data can be transferred at a high speed.

DESCRIPTION OF THE PREFERRED EMBODIMENTS

An embodiment of the present invention is now described.

Figure 1A:
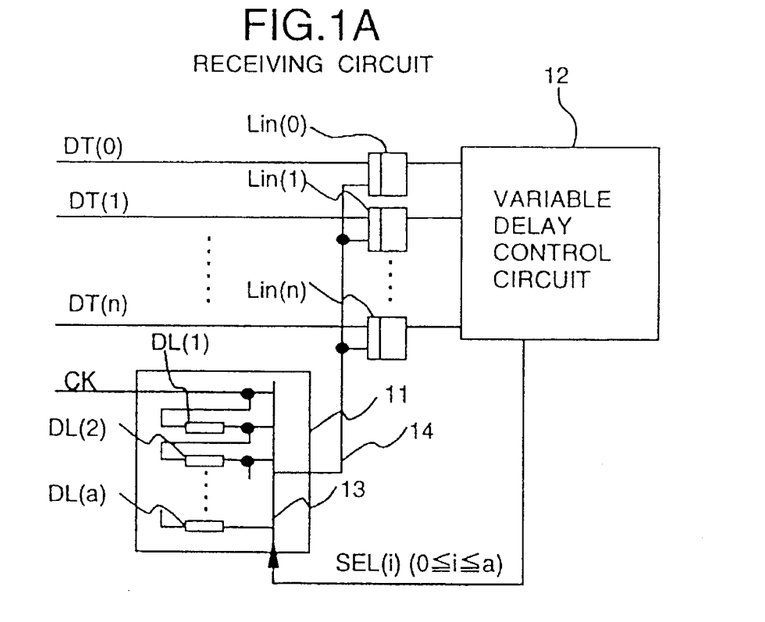
FIGS. 1A and 1B schematically illustrate a first embodiment of the present invention.
Figure 1B:
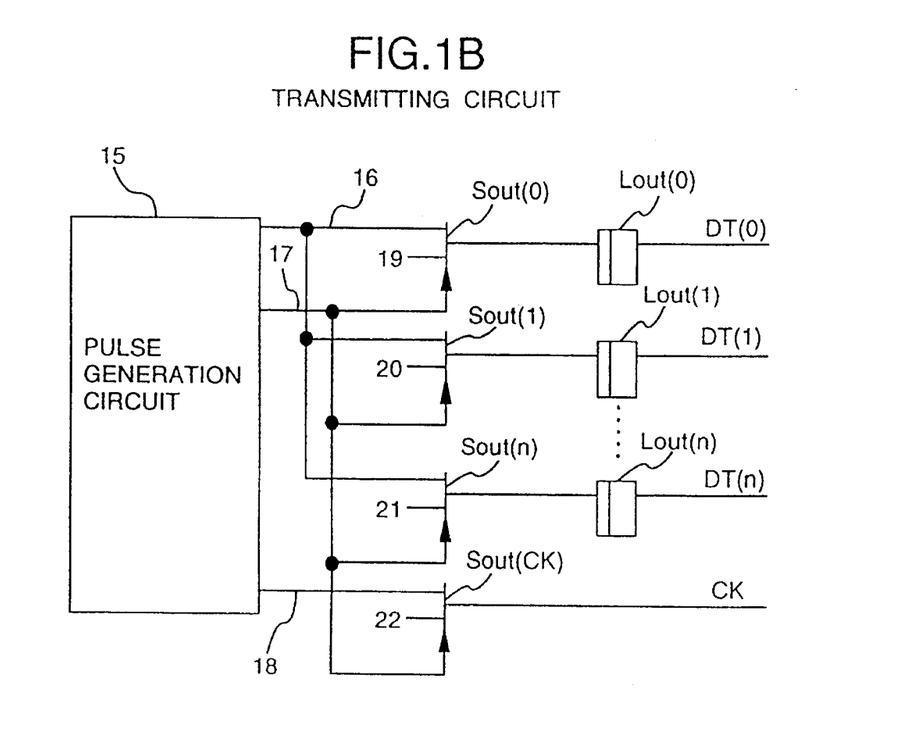

FIGS. 1A and 1B schematically illustrate a first embodiment of a data transfer apparatus according to the present invention. FIG. 1A is a schematic diagram illustrating a receiving circuit in a receiving apparatus and FIG. 1B is a schematic diagram illustrating a driver circuit or a transmitting circuit in a transmitting apparatus.

The receiving circuit is now described. DT(0) to DT(n) represent data, CK represents a data write control signal such as a clock, and $L_{in}(0)$ to $L_{in}(n)$ indicate latch circuits for latching the data DT(0) to DT(n), respectively, by a clock 14 produced by delaying the data write control signal CK by a variable delay circuit 11. A variable delay control circuit 12 produces a selection signal SEL(i) ($0 \leq i \leq a$) for a selector 13 on the basis of outputs of the latch circuits $L_{in}(0)$ to $L_{in}(n)$.

A delay time of the variable delay circuit 11 is controlled by the selection signal SEL(i) to adjust a phase of the clock. The variable delay circuit 11 includes, for example, delay circuits DL(1) to DL(a) having a predetermined amount of delay and connected as shown in FIG. 1A. The variable delay circuit is adapted to design the whole delay time in consideration of scattered propagation times of data so that even the latest data can be latched. The selection signal SEL(i) is constituted by (a+1) signals and one of them is turned on to be supplied to the selector 13. The selector 13 selects (a+1) clocks having different timing, which are CK and the delayed signals by the delay circuits DL(1) to DL(a). For example, the selector selects the signal CK as it is for i=0 and a clock output added with the delay of the delay circuit DL(1) for i=1.

The transmitting circuit is now described. Numeral 15 denotes a pulse generation circuit. Pulse signals generated by the circuit 15 are transferred through a signal line 16, to selectors $S_{out}(0)$ to $S_{out}(n)$ and latch circuits $L_{out}(0)$ to $L_{out}(n)$ to the receiving circuit as data DT(0) to DT(n). Similarly, another pulse signal is transferred through a signal line 18 and a selector $S_{out}(CK)$ to the receiving circuit as clock CK.

The selectors $S_{out}(0)$ to $S_{out}(n)$ and $S_{out}(CK)$ are supplied with a selection signal 17 so as to select pulse signals on the signal lines 16 and 18 during adjustment of the phase of the received clock in the receiving apparatus. Further, signal lines 19 to 22 are used to input data and clock signals in normal operation.

Figure 2:
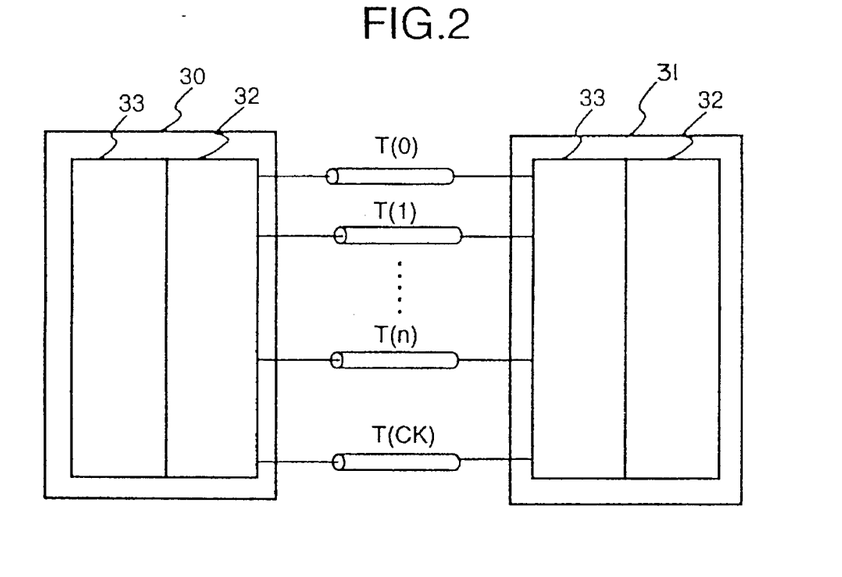
FIG. 2 is a diagram illustrating a connection of a receiving circuit and a transmitting circuit of FIG. 1.

FIG. 2 is a diagram illustrating a connection of the receiving circuit and the transmitting circuit. Numerals 30 and 31 represent data input/output apparatuses, such as a computer, constituting a work station and the like and a line concentration apparatus for relaying data. Numerals 32 and 33 represent the transmitting circuit and the receiving circuit of FIG. 1, respectively, both of which are usually included in one apparatus to perform transmission and reception of data. T(0) to T(n) and T(CK) represent transmission lines such as wirings on a printed wiring board and cables. The transmission lines T(0) to T(n) are used to transfer the data DT(0) to DT(n) of FIG. 1 and the transmission line T(CK) is used to transfer the clock CK.

Figure 3:
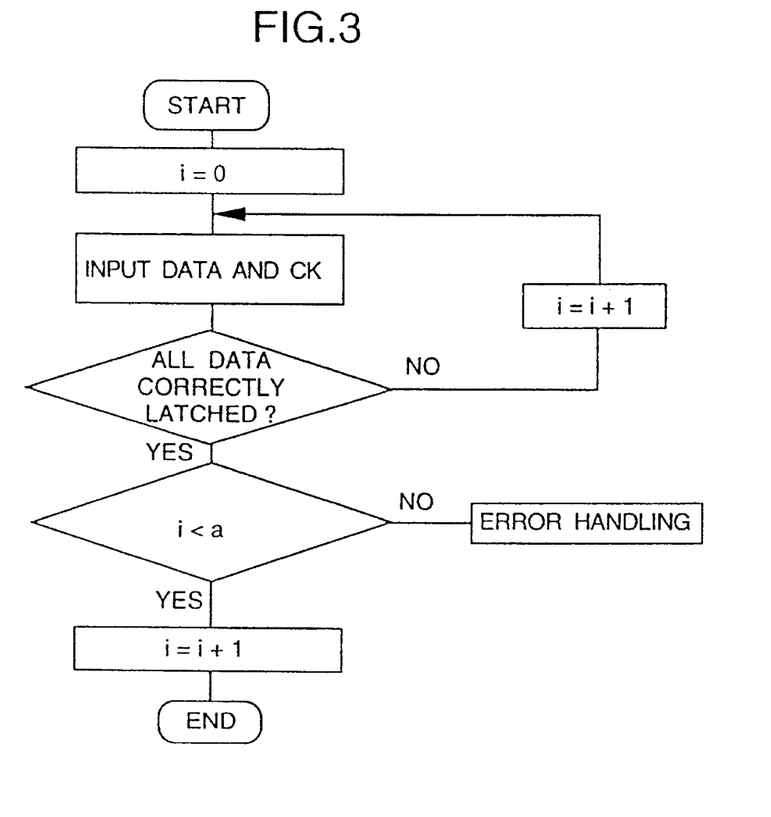
FIG. 3 is a flow chart showing operation of FIG. 1.
Figure 4A:
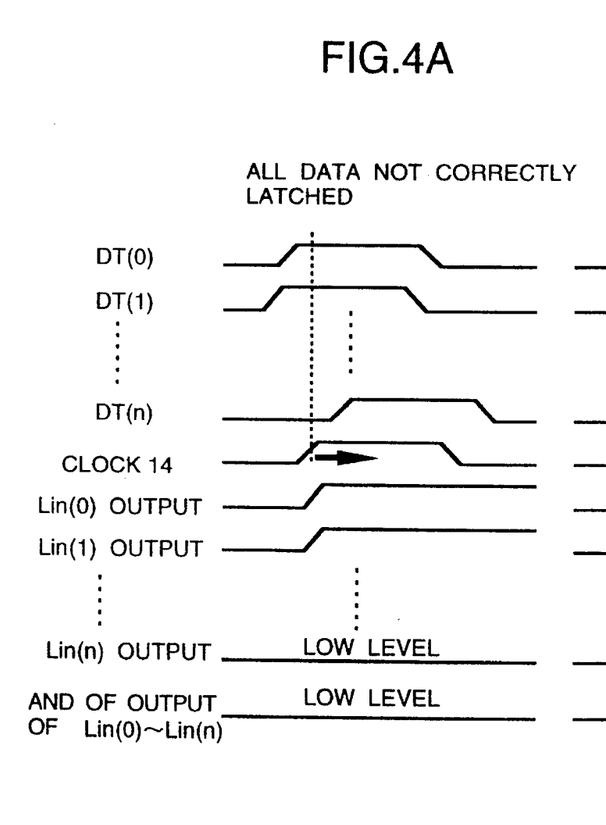
FIGS. 4A and 4B are timing charts explaining operation of FIG. 1.
Figure 4B:
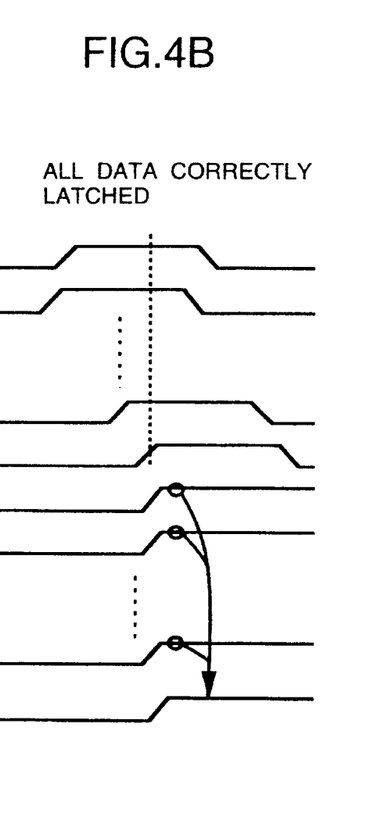

Referring now to FIGS. 3 and 4, operation of the first embodiment is described. FIGS. 3 and 4 are a flow chart, and a timing chart, respectively for explaining operation of the apparatus of FIG. 1.

The phase adjustment of the clock is performed before actual transfer of data such as just after turning on the power supply. First of all, the parameter i is reset at the beginning of the phase adjustment to turn on the selection signal SEL(0). At this state, the data DT(0) to DT(n) and the clock CK are input from the transmitting circuit as a one-pulse signal. The data DT(0) to DT(n), the clock 14, the outputs of the latch circuits $L_{in}(0)$ to $L_{in}(n)$, and an AND signal of the outputs of the latch circuits $L_{in}(0)$ to $L_{in}(n)$ in the receiving circuit are as shown in FIG. 4. Such an AND signal can be obtained by using a usual logic circuit.

When the clock 14 is earlier than the latest data (DT(n) in FIG. 4) of the data DT(0) to DT(n), not all of the data can be latched correctly and the AND signal of the outputs of the latch circuits $L_{in}(0)$ to $L_{in}(n)$ is a low level as shown in FIG. 4A, and when the clock 14 is later than the latest data of the data DT(0) to DT(n), all of the data can be latched correctly and the AND signal of the outputs of the latch circuits is a high level. When not all of the data can be latched, the parameter i is incremented and the selector 13 selects the output of the delay circuit DL(1), so that the clock 14 is delayed in the direction shown by arrow of FIG. 4A.

At this state, inputting of the next data and clock CK is awaited. The data and clock CK may be supplied from the transmitting circuit at intervals of a fixed time or may be supplied from the transmitting circuit in response to a request signal issued from the receiving circuit after completion of adjustment of the clock. Until the AND signal of the outputs of the latch circuits $L_{in}(0)$ to $L_{in}(n)$ becomes high, the above control is repeated and when the AND signal of the outputs of the latch circuits $L_{in}(0)$ to $L_{in}(n)$ becomes high, the latched state "ALL DATA CORRECTLY LATCHED" shown in FIG. 3 is attained.

When the parameter i at this time is not the maximum value a, the parameter i is incremented and the phase adjustment is completed. When the parameter i is the maximum a, the parameter i cannot be incremented any more. Accordingly, the phase adjustment fails and the error handling is performed. This state occurs since the propagation time is scattered greatly when longer transmission lines than those decided by the design are connected, for example, so that the propagation time exceeds a compensation range of the variable delay circuit. Further, the increment of the parameter i is a process for avoiding a metastable state of the latch circuits $L_{in}$ (the outputs of the latches are indefinite for a long time) produced when the timing of the input data and clock of the latch circuits $L_{in}$ does not satisfy the set-up time of the latch circuits $L_{in}$. By delaying the clock as described above, all of the input data can be latched correctly.

In the embodiment, the parameter i is incremented in order to avoid the metastable state, while a delay element provided separately from the variable delay circuit 11 may be used to delay the clock 14 by a fixed time after the completion of the adjustment. Further, the data and CK to be transferred during the adjustment use the pulse signals of one-pulse signal, a predetermined pattern may be transferred. In this case, when the predetermined pattern for data bits can be latched, all of the data can be latched correctly.

By using the circuit of the first embodiment, the cycle time of the data and the clock is minimized to (tskw_prop+ tsu+th) as shown in FIG. 12, so that the data transfer can be attained at a high speed. In FIGS. 1A and 1B, the variable delay circuit 11 and the variable delay control circuit 12 are illustrated as the receiving circuit, while the same effect can be obtained even if parts, or the entirety, whole of these circuits are provided within the transmitting circuit or the communication path.

Figure 5:
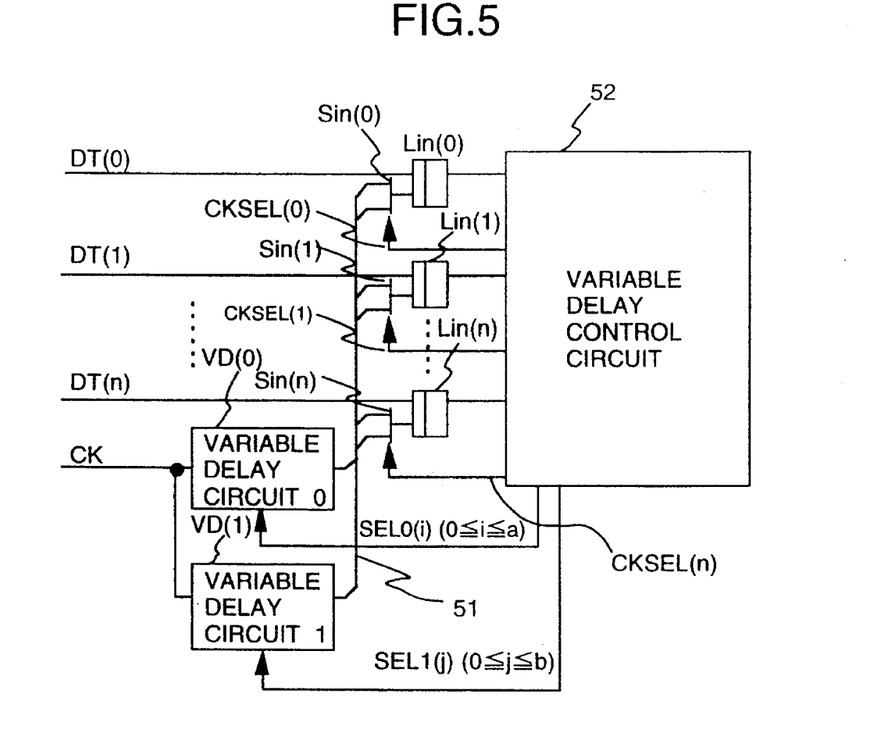
FIG. 5 schematically illustrates a second embodiment of the present invention.
Figure 6:
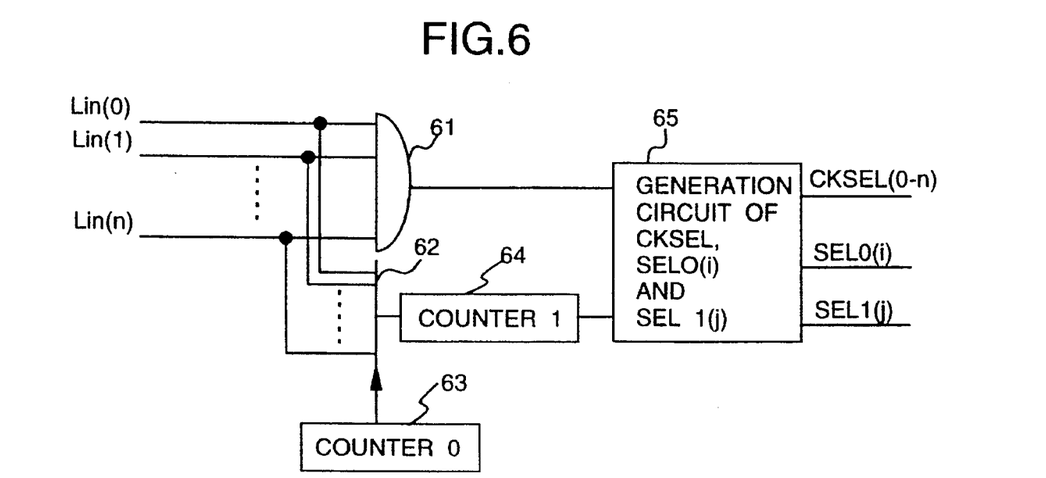
FIG. 6 is a schematic diagram illustrating an example of a variable delay control circuit of FIG. 5.
Figure 7:
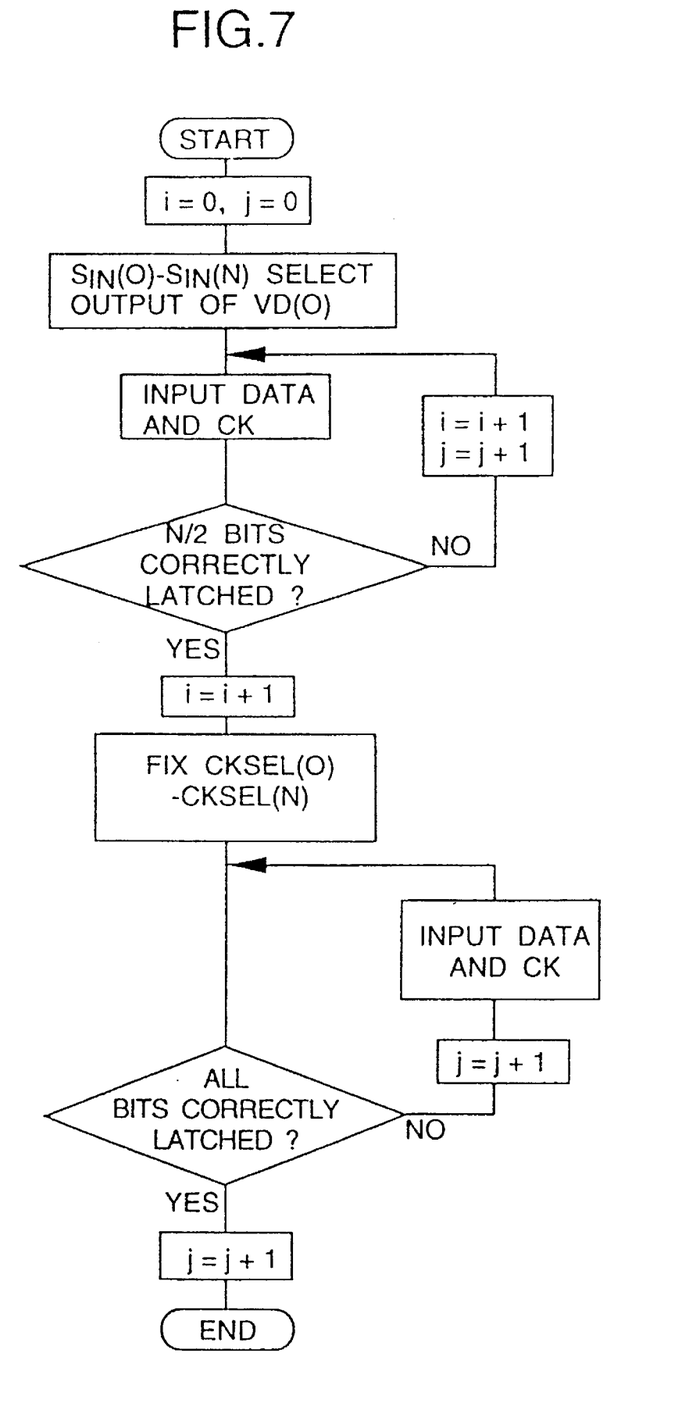
FIG. 7 is a flow chart showing operation of FIG. 5.

FIG. 5 is a schematic diagram illustrating a second embodiment of the data transfer apparatus of the present invention, FIG. 6 is a schematic diagram illustrating an example of a variable delay control circuit 52 of FIG. 5, and FIG. 7 is a flow chart showing operation of the apparatus of FIG. 5. In the embodiment, a plurality of variable delay circuits can be used to latch all data even if the skew is increased.

FIG. 5 illustrates the receiving circuit, and the transmitting circuit uses the same circuit as that of FIG. 1B. DT(0) to DT(n) represent data, CK represents the data write control signal such as the clock, and $L_{in}(0)$ to $L_{in}(n)$ represent the latch circuits for latching the input data DT(0) to DT(n). Clocks 51 delayed by a variable delay circuit 0 of VD(0) and a variable delay circuit 1 of VD(1) are selected by selectors $S_{in}(0)$ to $S_{in}(n)$ and the data is latched by outputs of the selectors. A variable delay control circuit 52 produces selection signals CKSEL(0) to CKSEL(n) for the selectors $S_{in}(0)$ to $S_{in}(n)$ in accordance with the outputs of the latch circuits $L_{in}(0)$ to $L_{in}(n)$ to control the outputs of the selectors $S_{in}(0)$ to $S_{in}(n)$. Further, the variable delay control circuit 52 produces selection signals SEL0(i) and SEL1(j) for the variable delay circuit 0 and the variable delay circuit 1, respectively, so that delay times of the variable delay circuits 0 and 1 are controlled by the selection signals SEL0(i) and SEL1(j), respectively. The variable delay circuits 0 and 1 have the same configuration as that of the variable delay circuit 11 of FIG. 1. The selection signal SEL0(i) is constituted by (a+1) signals and one of them is turned on to thereby select (a+1) clocks having different timings. Similarly, the selection signal SEL1(j) is constituted by (b+1) signals and one of them is turned on to thereby select (b+1) clocks having different timings.

Referring now to FIG. 7, operation of the second embodiment is described. At the beginning of adjustment of the phase of the clock, the selectors $S_{in}(0)$ to $S_{in}(n)$ select the output of the variable delay circuit 0 and parameters i and j are reset so that the selection signals SEL0(0) and SEL1(0) are turned on. In this state, the input data DT(0) to DT(n) and the clock CK are input from the transmitting circuit as one-pulse signal. When the outputs of the latch circuits $L_{in}$ corresponding to about n/2 bits are not high, judgment of FIG. 7 as to whether n/2 bits are latched correctly or not fails and the parameters i and j are incremented, so that the clock 51 is delayed by a predetermined amount of delay. At this state, inputting of the next data and clock CK is awaited. The above control is repeated until the outputs of the latch circuits $L_{in}$ corresponding to n/2 bits become high. When the outputs of the latch circuits $L_{in}$ corresponding to n/2 bits become high, the judgment of FIG. 7 as to whether n/2 bits are latched correctly or not is successful and the parameter i is incremented. Further, the clock selection signals CKSEL(0) and CKSEL(n) are fixed so that the selectors $S_{in}$ (0) to $S_{in}(n)$ for the data which can be latched select the output of the variable delay circuit 0, and the selector $S_{in}(0)$ to $S_{in}(n)$ for the data which cannot be latched select the output of the variable delay circuit 1. When all bits can be latched correctly after n/2 bits have been latched correctly, the parameter ij is incremented and the adjustment is completed. When not all bits can be latched correctly, the parameter j is incremented and inputting of the next data and clock CK is awaited. The increment of the parameter j and the inputting of the data and clock CK are continued until all bits can be latched, and when all bits can be latched correctly, the parameter j is incremented and the adjustment of phase for all data is completed.

The increment of the parameter i when n/2 bits can be latched correctly and the increment of the parameter j when all bits can be latched are processes for avoiding the metastable state in the same manner as in the first embodiment. Further, the judgment as to whether n/2 bits can be latched correctly or not is performed by supplying a selection signal to a selector 62 by a counter 0 designated by 63 in FIG. 6 so as to successively select the outputs of the latch circuits $L_{in}(0)$ to $L_{in}(n)$ and, when the outputs of the latch circuits $L_{in}(0)$ to $L_{in}(n)$ are high, by counting the high-level outputs by a counter 1 designated by 64. An AND circuit 61 is a circuit for taking an AND of the outputs of the latch circuits $L_{in}(0)$ to $L_{in}(n)$ and is used for the judgment as to whether all bits can be latched correctly or not. A generation circuit 65 for the clock selection signal CKSEL and the selection signals SEL0(i) and SEL1(j) controls the CKSEL(0) to CKSEL(n) and the SEL0(i) to SEL1(j) in accordance with the outputs of the counter 1 and the AND circuit 61. As described above, by delaying the clock, the data of approximately n/2 bits can be latched by the output of the variable delay circuit 0 and the remaining data of about n/2 bits can be latched by the variable delay circuit 1.

Consequently, as shown in FIG. 13, the cycle time of the data and the clock is minimized to {(tskw_prop)/2+tsu+th} and the data can be transferred at a high speed. In the embodiment, the variable delay circuits VD(0) and VD(1) and the variable delay control circuit 52 of FIG. 5 are illustrated as the receiving circuit, while even if these circuits are provided within the transmitting circuit, the same effects can be obtained. Further, in the embodiment, two clocks are generated by the variable delay circuits 0 and 1 and the data of approximately n/2 bits are latched by the respective clocks, while if n/m ($1 \leq m \leq n$) variable delay circuits are provided and n/m clocks are generated to thereby latch data of m bits by the respective clocks, the cycle time of the data and clock can be made smaller than {(tskw_prop)/2+tsu+th) and the data can be transferred at a higher speed.

Figure 8:
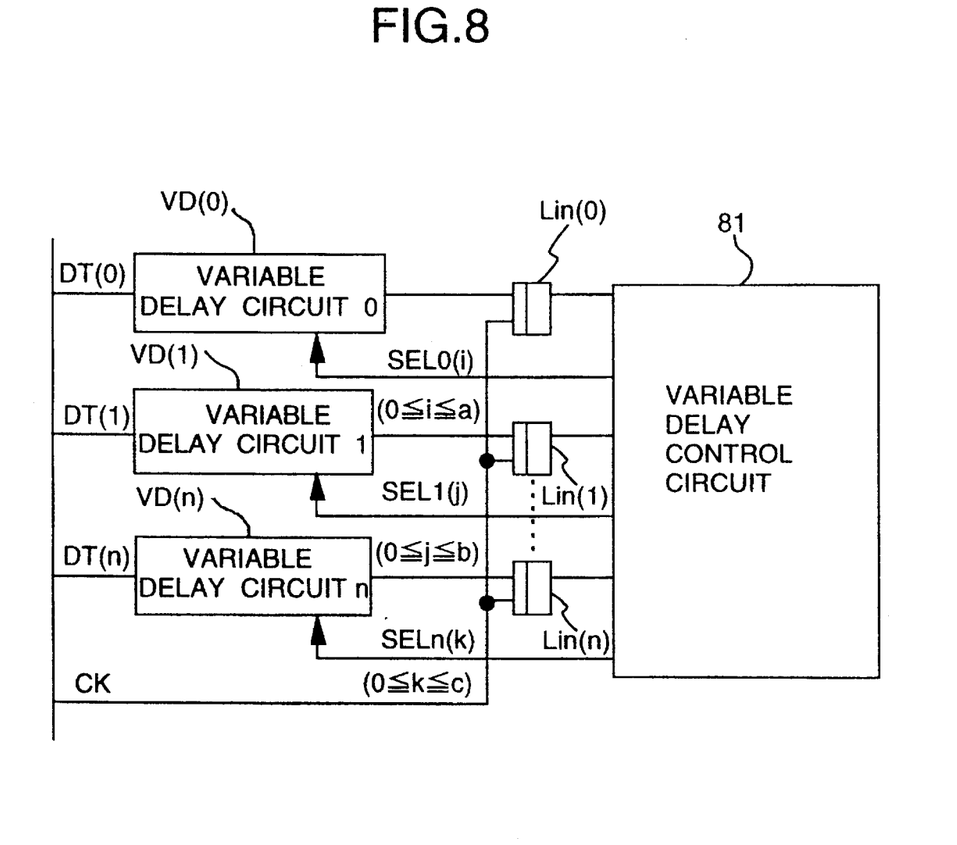
FIG. 8 is a schematic diagram illustrating a third embodiment of the present invention.
Figure 9:
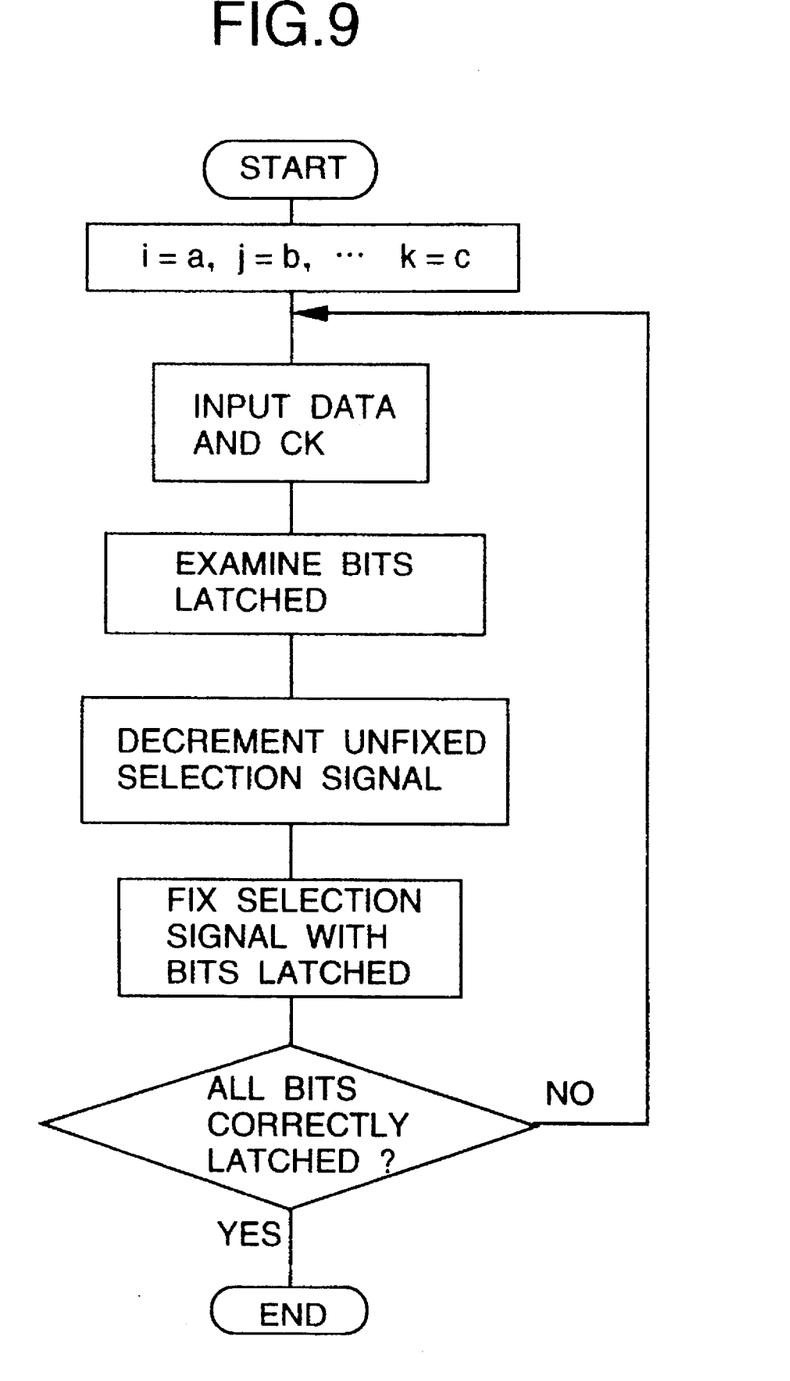
FIG. 9 is a flow chart showing operation of FIG. 8.

FIG. 8 is a schematic diagram illustrating a third embodiment of a data transfer apparatus of the present invention and FIG. 9 is a flow chart showing operation of the apparatus of FIG. 8. FIG. 8 illustrates a receiving circuit, and the transmitting circuit uses the same circuit as that of FIG. 1. DT(0) to DT(n) represent data, CK represents the data write control signal such as the clock, and $L_{in}(0)$ to $L_{in}(n)$ the latch circuits for latching the input data DT(0) to DT(n) delayed by a variable delay circuit 0 designated by VD(0) to a variable delay circuit n designated by VD(n) in response to the CK. A variable delay control circuit 81 produces selection signals SEL0(i) to SELn(k) for the variable delay circuits 0 to n in accordance with outputs of the latch circuits $L_{in}(0)$ to $L_{in}(n)$ and controls delay times of the variable delay circuits 0 to n in accordance with the selection signals SEL(i) to SEL(k). The variable delay circuits 0 to n have the same configuration as that of the variable delay circuit 11 of FIGS. 1A. The selection signal SEL0(i) is constituted by (a+1) signals and one of them is turned on to thereby select of (a+1) clocks having different timings. The selection signals SEL1(j) and SELn(k) are the same as the selection signal SEL0(i).

Referring now to FIG. 9, operation of the third embodiment is described. Parameters i to k are set to maximum values thereof at the beginning of the phase adjustment of the clock and the selection signals SEL0(a), SEL1(b) . . . SELn(c) are turned on. At this state, the data DT(0) to DT(n) and the signal CK are input from the transmitting circuit as a one-pulse signal. Outputs of the latch circuits $L_{in}(0)$ to $L_{in}(n)$ are then examined and unfixed selection signals SEL0(i) to SELn(k) are decremented. Then, the selection signals by which bits can be latched are fixed. At this state, inputting of the next data and CK is awaited. The above process is repeated until all bits can be latched correctly and when all bits can be latched correctly, the phase adjustment for all data is completed. In the embodiment, since the selection signals are decremented before fixing the selection signals by which bits can be latched, the metastable state can be avoided in the same manner as the first embodiment. In contrast to the first and second embodiments, in the third embodiment, the decrement is performed in order to assure that the timing of the input data and the input clock to the latch circuit $L_{in}$ satisfies the hold time of the latch circuit Lin. As described above, by delaying the data, all input data can be latched. Consequently, as shown in FIG. 14, the cycle time of the data and clock is minimized to (tsu+th) and the data transfer can be performed at a high speed. In the embodiment, the variable delay circuits VD(0) to VD(n) and the variable delay control circuit 81 of FIG. 8 are illustrated as the receiving circuit, while even if these circuits are provided in the transmitting circuit, the same effects can be obtained.

Figure 15:
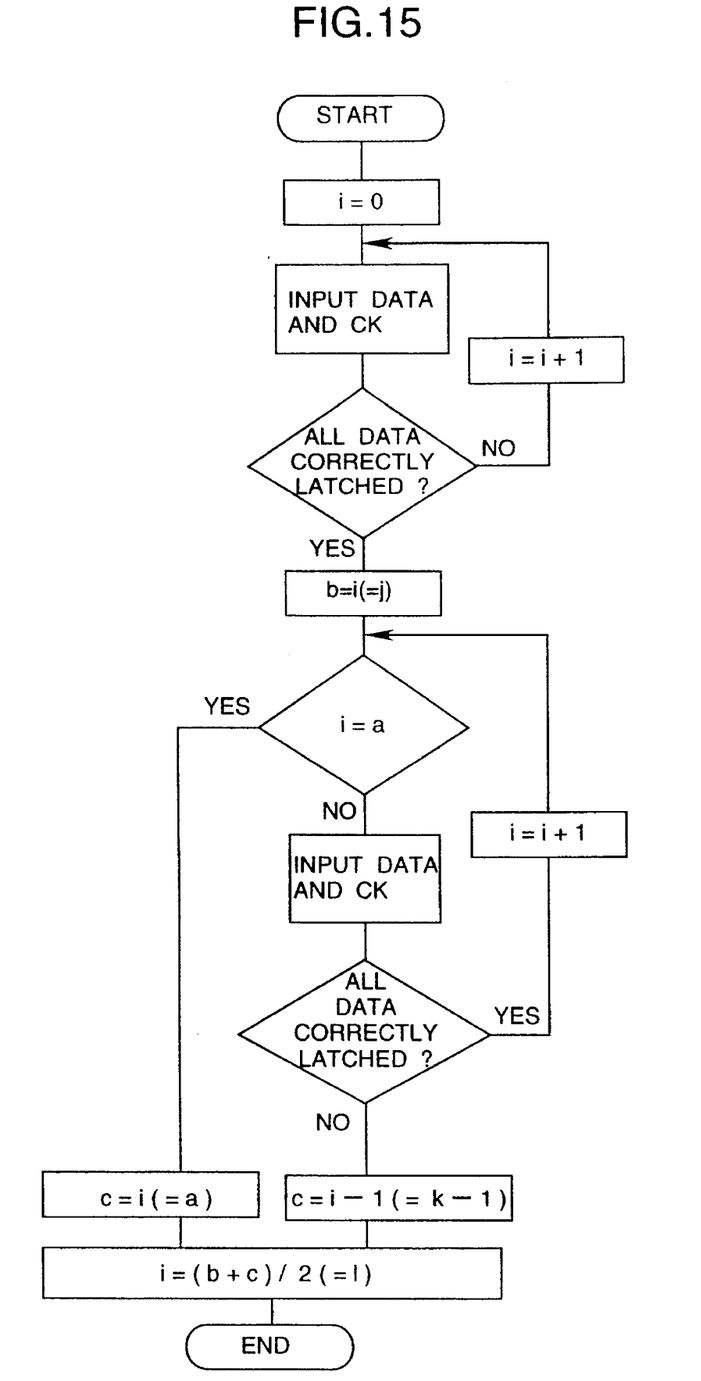
FIG. 15 is a flow chart showing another operation of FIG. 1.
Figure 16:
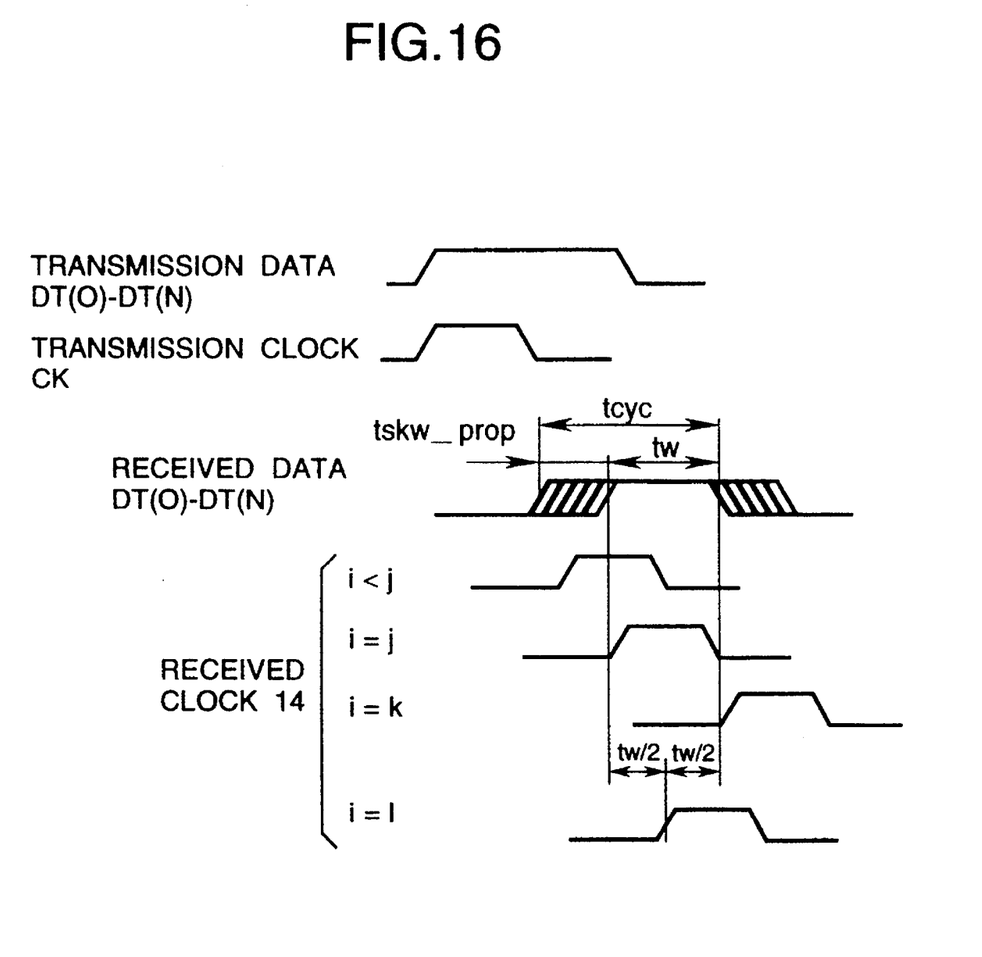
FIG. 16 is a timing chart showing another operation of FIG. 1.

Referring now to FIGS. 15 and 16, another operation of FIGS. 1A and 1B is described. FIGS. 15 and 16 are a flow chart and a timing chart for explaining operation of the apparatus of FIGS. 1A and 1B, respectively. The phase adjustment of the clock is performed before actual transfer of data, such as just after turning on the power supply. First of all, at the beginning of the phase adjustment, the parameter i is reset and SEL(0) is turned on. At this state, the data DT(0) to DT(n) and the clock CK are produced from the transmitting circuit as a one-pulse signal as shown by the transmission data and the transmission clock of FIG. 16. The received data has the skew tskw_prop due to scattered delay times by drivers of the transmitting circuit, transmission lines, receivers of the receiving circuit and the like. Accordingly, the valid data area of the cycle time tcyc of the data in which all of data can be latched is tw. When the timing of the rising edge of the clock 14 is earlier than the latest received data (i<j), not all of the data can be latched. When not all of the data can be latched, the parameter i is incremented and the selector 13 selects the output of the delay circuit DL(1) to delay the clock 14. At this state, inputting of the next data and CK is awaited. The above control is repeated until i=j. When i=j, the rising edge of the clock 14 falls within the valid data area and the state in which all of data can be latched is attained.

The value of the parameter j is preserved in a register b. Further, when the parameter i is incremented, the rising edge of the clock goes over the valid data area (i=k) and the state in which all of data cannot be latched occurs again. The value of the parameter i at the limit in which all of the data can be latched is (k−1) and this value is preserved in a register c. When the cycle time tcyc is made larger than that in the usual operation upon an examination or the like, the valid area tw of data is increased and there is a possibility that the state in which not all of the data can be latched does not occur even if the parameter i becomes the maximum value a. In this case, the value a is preserved in the register c. Finally, the parameter i is set to (b+c)/2 and the adjustment is completed. As described above, by delaying the clock, the edge of the clock can be set in the center of the valid area tw in which all of the data can be latched.

According to the embodiment, even when the skew of the data and clock to be transferred is increased, the data transfer can be attained.

Many different embodiments of the present invention may be constructed without departing from the spirit and scope of the invention. It should be understood that the present invention is not limited to the specific embodiments described in this specification. To the contrary, the present invention is intended to cover various modifications and equivalent arrangements included within the spirit and scope of the claims.

What is claimed is:

1. A data transfer method comprising the steps of:

generating a plurality of data and a clock having a predetermined timing relationship to said plurality of data;

transferring said data and clock in parallel;

receiving said transferred data and clock; and inputting said plurality of data to latch circuits after adjusting phase of said data and clock by using output signals of the latch circuits when said plurality of data are latched at timing of the received clock, wherein the phase of said clock and a first data group including a part of said plurality of data is adjusted by means of a first delay circuit so that an AND signal of latched output signals corresponding to said first data group is high level and the phase of said clock and a second data group of said plurality of data other than said first data group is then adjusted by means of a second delay circuit so that an AND signal of latched output signals corresponding to said second data group is high level.

2. An apparatus for parallel data transfer comprising:

a transmitting apparatus including:
a pulse generation circuit for generating a plurality of data for adjusting phase, and
a clock having a predetermined timing relation to said plurality of data;

a receiving apparatus for receiving said data and said clock;

transmission lines for connecting said transmitting apparatus and said receiving apparatus;

wherein said receiving apparatus includes:
means for delaying said clock received utilizing a variable delay circuit,
a latch circuit for latching said data with timing of said delayed clock, and
a variable delay control circuit for controlling an amount of delay of said variable delay circuit utilizing the output signal of said latch circuit,
wherein said variable delay control circuit includes first and second variable delay circuits for generating a first and a second clock, respectively, by utilizing said delayed clock; and means for adjusting the phase of said first clock by utilizing said first variable delay circuit to thereby latch a first portion of said data in said latch circuit so that an AND signal of latched output signals corresponding to said first portion of said data is high level and for adjusting the phase of said second clock by utilizing said second variable delay circuit to thereby latch a second portion of said data in said latch circuit so that an AND signal of latched output signals corresponding to said second portion of said data is high level.

3. An apparatus as claimed in claim 2, further including:

a selector circuit for sequentially selecting output of said latch circuit;

a first counter for sending a select signal to said selector circuit; and a second counter circuit for counting a number of outputs of said latch circuit, wherein control of said first variable delay circuit is stopped when an output value of said second counter circuit exceeds half of said plurality of data, and control of said second variable delay control circuit is stopped when all of said data has been latched.

4. An apparatus for parallel data transfer comprising:

a transmitting apparatus including:
a pulse generation circuit for generating a plurality of data for adjusting phase, and
a clock having a predetermined timing relation to said plurality of data;

a receiving apparatus for receiving said data and said clock;

transmission lines for connecting said transmitting apparatus and said receiving apparatus;

wherein said receiving apparatus includes:
means for delaying said data received utilizing a variable delay circuit,
a latch circuit for latching said delayed data with timing of said clock, and
a variable delay control circuit for controlling an amount of delay of said variable delay circuit utilizing the output signal of said latch circuit.
wherein said variable delay control circuit includes first and second variable delay circuits for generating a first and a second clock, respectively, by utilizing said delayed data; and means for adjusting the phase of said first clock by utilizing said first variable delay circuit to thereby latch a first portion of said delayed data in said latch circuit so that an AND signal of latched output signals corresponding to said first portion of said delayed data is high level and for adjusting the phase of said second clock by utilizing said second variable delay circuit to thereby latch a second portion of said delayed data in said latch circuit so that an AND signal of latched output signals corresponding to said second portion of said delayed data is high level.

5. An apparatus as claimed in claim 2, further including:

a selector circuit for sequentially selecting output of said latch circuit:

a first counter for sending a select signal to said selector circuit; and a second counter circuit for counting a number of outputs of said latch circuit, wherein control of said first variable delay circuit is stopped when an output value of said second counter circuit exceeds half of said plurality of data, and control of said second variable delay control circuit is stopped when all of said data has been latched.

* * * * *